United States Patent
Guo et al.

(10) Patent No.: US 10,164,903 B2
(45) Date of Patent: Dec. 25, 2018

(54) METHOD FOR CONTROLLING ACCESS OF APPLICATION TO NETWORK, AND DEVICE

(71) Applicant: Huawei Technologies Co., Ltd., Shenzhen (CN)

(72) Inventors: Yali Guo, Shenzhen (CN); De Chen, Beijing (CN); Wanqiang Zhang, Munich (DE); Weisheng Jin, Shanghai (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 373 days.

(21) Appl. No.: 15/142,193

(22) Filed: Apr. 29, 2016

(65) Prior Publication Data
US 2016/0248701 A1 Aug. 25, 2016

Related U.S. Application Data

(63) Continuation of application No. PCT/CN2013/086391, filed on Nov. 1, 2013.

(51) Int. Cl.
*G06F 15/173* (2006.01)
*H04L 12/911* (2013.01)
(Continued)

(52) U.S. Cl.
CPC ............ *H04L 47/824* (2013.01); *H04L 47/24* (2013.01); *H04W 4/60* (2018.02); *H04W 28/0289* (2013.01); *H04W 48/08* (2013.01)

(58) Field of Classification Search
CPC ........ H04L 47/824; H04L 47/24; H04W 4/60; H04W 28/0289; H04W 48/08
(Continued)

(56) References Cited

U.S. PATENT DOCUMENTS

| 2001/0049790 A1* | 12/2001 | Faccin | H04L 63/104 713/185 |
| 2011/0280127 A1* | 11/2011 | Raaf | H04L 45/125 370/230 |

(Continued)

FOREIGN PATENT DOCUMENTS

| CN | 102238629 A | 11/2011 |
| CN | 102300285 A | 12/2011 |

(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol Specification (Release 11)," 3GPP TS 36.331 V11.5.0, Sep. 2013, pp. 1-347.

*Primary Examiner* — Philip B Tran
(74) *Attorney, Agent, or Firm* — Slater Matsil, LLP

(57) ABSTRACT

Embodiments of the present application provide a method for controlling access of an application to a network, and a device. The method includes: acquiring application configuration information, where the application configuration information includes identification information of an application that is allowed to access a network or identification information of an application that is prohibited from accessing a network. The method also includes receiving access control information that is sent by an access network device, and determining, according to the application configuration information and the access control information, whether to allow an application of user equipment to access the network.

15 Claims, 5 Drawing Sheets

(51) Int. Cl.
*H04W 48/08* (2009.01)
*H04L 12/851* (2013.01)
*H04W 28/02* (2009.01)
*H04W 4/60* (2018.01)

(58) Field of Classification Search
USPC .................................................. 709/225, 224
See application file for complete search history.

(56) References Cited

U.S. PATENT DOCUMENTS

| | | | |
|---|---|---|---|
| 2012/0166617 A1* | 6/2012 | Chang | H04W 76/02 |
| | | | 709/224 |
| 2012/0214527 A1* | 8/2012 | Meylan | H04L 69/32 |
| | | | 455/509 |
| 2013/0150030 A1 | 6/2013 | Lim et al. | |
| 2014/0024375 A1* | 1/2014 | Fitzpatrick | H04W 36/30 |
| | | | 455/436 |
| 2015/0189631 A1* | 7/2015 | He | H04W 72/042 |
| | | | 455/418 |
| 2015/0249673 A1* | 9/2015 | Niemoeller | H04W 12/08 |
| | | | 726/4 |

FOREIGN PATENT DOCUMENTS

| | | |
|---|---|---|
| CN | 102761933 A | 10/2012 |
| CN | 103096495 A | 5/2013 |

* cited by examiner

METHOD FOR CONTROLLING ACCESS OF APPLICATION TO NETWORK, AND DEVICE

This application is a continuation of International Application No. PCT/CN2013/086391, filed on Nov. 1, 2013, which is hereby incorporated by reference in the entirety.

TECHNICAL FIELD

Embodiments of the present application relate to the field of communications technologies, and in particular, to a method for controlling access of an application to a network, and a device.

BACKGROUND

In recent years, as wireless mobile Internet applications rapidly develop, various applications can be easily downloaded and installed on mobile terminals (such as mobile phones and tablet computers). Some applications require network connection in a running process. These applications may occupy a large number of network resources. Therefore, operators hope to control these applications. Especially, when congestion occurs on a network, an operator hopes to control an application that accesses the network, so as to achieve an objective of reducing a burden on the network. In addition, when congestion occurs on a network, an operator further needs to ensure normal running of some important applications (such as a disaster bulletin board service and a disaster voice service). Therefore, how to flexibly control access of an application to a network is a problem to be urgently resolved.

SUMMARY

Embodiments of the present application provide a method for controlling access of an application to a network, and a device, which can effectively control an application that accesses a network.

According to a first aspect, an embodiment of the present application provides a method for controlling access of an application to a network, where the method is executed by user equipment. The method includes acquiring application configuration information, where the application configuration information includes identification information of an application that is allowed to access a network or identification information of an application that is prohibited from accessing a network. The method also includes receiving access control information that is sent by an access network device, and determining, according to the application configuration information and the access control information, whether to allow an application of the user equipment to access the network.

With reference to the first aspect, in a first possible implementation manner, the access control information includes user equipment class control information or classified control information.

With reference to the first possible implementation manner, in a second possible implementation manner, the access control information includes the user equipment class control information, and the determining, according to the application configuration information and the access control information, whether to allow an application of the user equipment to access the network includes: determining, according to a class of the user equipment, the user equipment class control information, and the application configuration information, whether to allow the application of the user equipment to access the network.

With reference to the second possible implementation manner, in a third possible implementation manner, the determining, according to a class of the user equipment, the user equipment class control information, and the application configuration information, whether to allow the application of the user equipment to access the network includes: receiving, by a protocol stack upper layer of the user equipment, the user equipment class control information that is sent by an access layer of the user equipment, and determining, by the protocol stack upper layer according to the class of the user equipment, the user equipment class control information, and the application configuration information, whether to allow the application of the user equipment to access the network, where the class of the user equipment is stored at the protocol stack upper layer or is received from the access layer by the protocol stack upper layer; or determining, by an access layer of the user equipment according to the class of the user equipment and the user equipment class control information, whether to allow the application of the user equipment to access the network; in a case in which a protocol stack upper layer of the user equipment receives determining information that is sent by the access layer and that is used to instruct to allow the application of the user equipment to access the network, determining, by the protocol stack upper layer according to the application configuration information, whether to allow the application of the user equipment to access the network; and in a case in which the protocol stack upper layer receives determining information that is sent by the access layer and that is used to instruct to prohibit the application of the user equipment from accessing the network, prohibiting, by the protocol stack upper layer, the application of the user equipment from being allowed to access the network.

With reference to the first possible implementation manner, in a fourth possible implementation manner, the identification information of an application that is allowed to access the network is classified identification information of the application that is allowed to access the network, or the identification information of an application that is prohibited from accessing the network is classified identification information of the application that is prohibited from accessing the network; correspondingly, the access control information includes the classified control information; and the determining, according to the application configuration information and the access control information, whether to allow an application of the user equipment to access the network includes: determining, according to the application configuration information and the classified control information, whether to allow the application of the user equipment to access the network.

With reference to the fourth possible implementation manner, in a fifth possible implementation manner, the determining, according to the application configuration information and the classified control information, whether to allow the application of the user equipment to access the network includes: receiving, by a protocol stack upper layer of the user equipment, the classified control information that is sent by an access layer of the user equipment, and determining, by the protocol stack upper layer according to the application configuration information and the classified control information, whether to allow the application of the user equipment to access the network.

With reference to the fourth possible implementation manner, in a sixth possible implementation manner, the access control information further includes the user equipment class control information, and the determining, according to the application configuration information and the classified control information, whether to allow the application of the user equipment to access the network includes: determining, according to a class of the user equipment, the user equipment class control information, the application configuration information, and the classified control information, whether to allow the application of the user equipment to access the network.

With reference to the sixth possible implementation manner, in a seventh possible implementation manner, the determining, according to a class of the user equipment, the user equipment class control information, the application configuration information, and the classified control information, whether to allow the application of the user equipment to access the network includes: receiving, by a protocol stack upper layer of the user equipment, the user equipment class control information and the classified control information that are sent by an access layer of the user equipment, and determining, by the protocol stack upper layer according to the class of the user equipment, the user equipment class control information, the classified control information, and the application configuration information, whether to allow the application of the user equipment to access the network, where the class of the user equipment is stored at the protocol stack upper layer or is received from the access layer by the protocol stack upper layer; or determining, by an access layer of the user equipment according to the class of the user equipment and the user equipment class control information, whether to allow the application of the user equipment to access the network; in a case in which a protocol stack upper layer of the user equipment receives determining information that is sent by the access layer and that is used to instruct to allow the application of the user equipment to access the network, determining, by the protocol stack upper layer according to the application configuration information and the classified control information, whether to allow the application of the user equipment to access the network, where the classified control information is received from the access layer; and in a case in which the protocol stack upper layer receives determining information that is sent by the access layer and that is used to instruct to prohibit the application of the user equipment from accessing the network, prohibiting, by the protocol stack upper layer, the application of the user equipment from being allowed to access the network.

With reference to any possible implementation manner of the fourth possible implementation manner to the seventh possible implementation manner, in an eighth possible implementation manner, the classified identification information of the application that is allowed to access the network is classified according to a priority, or the classified identification information of the application that is prohibited from accessing the network is classified according to a priority, and correspondingly, the classified control information is priority information. Or, the classified identification information of the application that is allowed to access the network is classified according to a congestion degree, or the classified identification information of the application that is prohibited from accessing the network is classified according to a congestion degree, and correspondingly, the classified control information is congestion degree information. Or, the classified identification information of the application that is allowed to access the network is classified according to an application group, or the classified identification information of the application that is prohibited from accessing the network is classified according to an application group, and correspondingly, the classified control information is group information of the application.

With reference to the first aspect or any one of the foregoing possible implementation manners, in a ninth possible implementation manner, the acquiring application configuration information includes: receiving the application configuration information that is sent by a core network device.

According to a second aspect, an embodiment of the present application provides a method for controlling access of an application to a network, where the method is executed by an access network device. The method includes determining that congestion occurs on a core network or an access network, sending access control information to user equipment. The access control information includes classified control information or user equipment class control information, the classified control information is used to control a category of an application that accesses the network, and the user equipment class control information is used to control a class of user equipment that accesses the network and instruct the user equipment to use application configuration information.

With reference to the second aspect, in a first possible implementation manner, in a case in which network congestion occurs on the core network, the access control information is determined according to an access reference indicator that is received from a core network device; or in a case in which congestion occurs on the access network, the access control information is determined according to a congestion degree of the access network.

With reference to the second aspect or the first possible implementation manner, in a third possible implementation manner, the classified control information includes any one of the following: priority information, a congestion degree information, and group information of the application.

According to a third aspect, an embodiment of the present application provides a method for controlling access of an application to a network, where the method is executed by a core network device. The method includes: determining application configuration information, where the application configuration information includes identification information of an application that is allowed to access a network or identification information of an application that is prohibited from accessing a network; and sending the application configuration information to user equipment.

With reference to the third aspect, in a first possible implementation manner, the method further includes: determining an access reference indicator, where the access reference indicator includes user equipment class reference information, and the user equipment class reference information is used to provide reference information for controlling a class of user equipment that accesses the network; and sending the access reference indicator to an access network device.

With reference to the third aspect, in a second possible implementation manner, the identification information of an application that is allowed to access the network is classified identification information of the application that is allowed to access the network, or the identification information of an application that is prohibited from accessing the network is classified identification information of the application that is prohibited from accessing the network. The method further includes: determining an access reference indicator, where the access reference indicator includes classified reference information, or the access reference indicator includes classified reference information and user class reference information, the classified reference information is used to provide reference information for controlling a category of an application that accesses the network, and the user equipment class control information is used to provide reference information for controlling a class of user equipment that accesses the network; and sending the access reference indicator to an access network device.

According to a fourth aspect, an embodiment of the present application provides user equipment, where the user equipment includes: a control unit, configured to acquire application configuration information, where the application configuration information includes identification information of an application that is allowed to access a network or identification information of an application that is prohibited from accessing a network. The user equipment also includes a receiving unit, configured to receive access control information that is sent by an access network device, where the control unit is further configured to determine, according to the application configuration information and the access control information that is received by the receiving unit, whether to allow an application of the user equipment to access the network.

With reference to the fourth aspect, in a first possible implementation manner, the access control information includes user equipment class control information, and the control unit is specifically configured to determine, according to a class of the user equipment, the user equipment class control information, and the application configuration information, whether to allow the application of the user equipment to access the network.

With reference to the first possible implementation manner, in a second possible implementation manner, the control unit includes a protocol stack upper layer subunit and an access layer subunit, where the protocol stack upper layer subunit is configured to receive the user equipment class control information that is sent by the access layer subunit, and determine, according to the class of the user equipment, the user equipment class control information, and the application configuration information, whether to allow the application of the user equipment to access the network, where the class of the user equipment is stored in the protocol stack upper layer subunit or is received from the access layer subunit by the protocol stack upper layer subunit; or the access layer subunit is configured to determine, according to the class of the user equipment and the user equipment class control information, whether to allow the application of the user equipment to access the network; the protocol stack upper layer subunit is configured to: in a case in which determining information that is sent by the access layer subunit and that is used to instruct to allow the application of the user equipment to access the network is received, determine, according to the application configuration information, whether to allow the application of the user equipment to access the network; and the protocol stack upper layer subunit is further configured to: in a case in which determining information that is sent by the access layer subunit and that is used to prohibit the application of the user equipment from accessing the network is received, prohibit the application of the user equipment from being allowed to access the network.

With reference to the fourth aspect, in a third possible implementation manner, the identification information of an application that is allowed to access the network is classified identification information of the application that is allowed to access the network, or the identification information of an application that is prohibited from accessing the network is classified identification information of the application that is prohibited from accessing the network, and correspondingly, the access control information includes classified control information; and the control unit is specifically configured to determine, according to the application configuration information and the classified control information, whether to allow the application of the user equipment to access the network.

With reference to the third possible implementation manner, in a fourth possible implementation manner, the control unit includes a protocol stack upper layer subunit and an access layer subunit, where the protocol stack upper layer subunit is configured to receive the classified control information that is sent by the access layer subunit, and the protocol stack upper layer subunit is further configured to determine, according to the application configuration information and the classified control information, whether to allow the application of the user equipment to access the network.

With reference to the third possible implementation manner, in a fifth possible implementation manner, the access control information further includes user equipment class control information, and the control unit is specifically configured to determine, according to a class of the user equipment, the user equipment class control information, the application configuration information, and the classified control information, whether to allow the application of the user equipment to access the network.

With reference to the fifth possible implementation manner, in a sixth possible implementation manner, the control unit includes a protocol stack upper layer subunit and an access layer subunit, where the protocol stack upper layer subunit is configured to receive the user equipment class control information and the classified control information that are sent by the access layer subunit, and the protocol stack upper layer subunit is further configured to determine, according to the class of the user equipment, the user equipment class control information, the classified control information, and the application configuration information, whether to allow the application of the user equipment to access the network, where the class of the user equipment is stored in the protocol stack upper layer subunit or is received from the access layer subunit by the protocol stack upper layer subunit; or the access layer subunit is configured to determine, according to the class of the user equipment and the user equipment class control information, whether to allow the application of the user equipment to access the network; the protocol stack upper layer subunit is configured to: in a case in which determining information that is sent by the access layer subunit and that is used to instruct to allow the application of the user equipment to access the network is received, determine, according to the application configuration information and the classified control information, whether to allow the application of the user equipment to access the network, where the classified control information is received from the access layer subunit; and the protocol stack upper layer subunit is further configured to: in a case in which determining information that is sent by the access layer subunit and that is used to instruct to prohibit the application of the user equipment from accessing the network is received, prohibit the application of the user equipment from being allowed to access the network.

With reference to any possible implementation manner of the third possible implementation manner to the sixth possible implementation manner, in a seventh possible implementation manner, the classified identification information of the application that is allowed to access the network is classified according to a priority, or the classified identification information of the application that is prohibited from accessing the network is classified according to a priority, and correspondingly, the classified control information received by the receiving unit is priority information; or the classified identification information of the application that is allowed to access the network is classified according to a congestion degree, or the classified identification information of the application that is prohibited from accessing the network is classified according to a congestion degree, and correspondingly, the classified control information received by the receiving unit is congestion degree information; or the classified identification information of the application that is allowed to access the network is classified according to an application group, or the classified identification information of the application that is prohibited from accessing the network is classified according to an application group, and correspondingly, the classified control information received by the receiving unit is group information of the application.

With reference to the fourth aspect or any one of the foregoing possible implementation manners, in an eighth possible implementation manner, the receiving unit is further configured to receive the application configuration information that is sent by a core network device; and the control unit is specifically configured to determine the application configuration information received by the receiving unit as the application configuration information.

According to a fifth aspect, an embodiment of the present application provides an access network device. The access network device includes: a control unit, configured to determine that congestion occurs on a core network or an access network, and a sending unit, configured to: in a case in which the control unit determines that congestion occurs on the core network or the access network, send access control information to user equipment. The access control information includes classified control information or user equipment class control information, the classified control information is used to control a category of an application that accesses the network, and the user equipment class control information is used to control a class of user equipment that accesses the network and instruct the user equipment to use application configuration information.

With reference to the fifth aspect, in a first possible implementation manner, the access network device further includes: a receiving unit, configured to receive an access reference indicator that is sent by a core network device, where the access reference indicator is sent in a case in which congestion occurs on the core network. The control unit is further configured to: according to the access reference indicator received by the receiving unit, determine that congestion occurs on the core network and determine the access control information.

With reference to the fifth aspect, in a second possible implementation manner, the control unit is further configured to: in a case in which the control unit determines that congestion occurs on the access network, determine the access control information according to a congestion degree of the access network.

According to a sixth aspect, an embodiment of the present application provides a core network device, where the core network device includes: a control unit, configured to determine application configuration information, where the application configuration information includes identification information of an application that is allowed to access a network or identification information of an application that is prohibited from accessing a network; and a sending unit, configured to send, to user equipment, the application configuration information determined by the control unit.

With reference to the sixth aspect, in a first possible implementation manner, the control unit is further configured to determine an access reference indicator, where the access reference indicator includes user equipment class reference information, and the user equipment class reference information is used to provide reference information for controlling a class of user equipment that accesses the network; and the sending unit is further configured to send, to an access network device, the access reference indicator determined by the control unit.

With reference to the sixth aspect, in a second possible implementation manner, the identification information of an application that is allowed to access the network is classified identification information of the application that is allowed to access the network, or the identification information of an application that is prohibited from accessing the network is classified identification information of the application that is prohibited from accessing the network. The control unit is further configured to determine an access reference indicator, where the access reference indicator includes classified reference information, or the access reference indicator includes classified reference information and user class reference information, the classified reference information is used to provide reference information for controlling a category of an application that accesses the network, and the user equipment class control information is used to provide reference information for controlling a class of user equipment that accesses the network. The sending unit is further configured to send, to an access network device, the access reference indicator determined by the control unit.

According to a seventh aspect, an embodiment of the present application provides user equipment. The user equipment includes: a processor, configured to acquire application configuration information, where the application configuration information includes identification information of an application that is allowed to access a network or identification information of an application that is prohibited from accessing a network. The user equipment also includes a receiver, configured to receive access control information that is sent by an access network device, where the processor is further configured to determine, according to the application configuration information and the access control information that is received by the receiver, whether to allow an application of the user equipment to access the network.

With reference to the seventh aspect, in a first possible implementation manner, the access control information includes user equipment class control information, and the processor is specifically configured to determine, according to a class of the user equipment, the user equipment class control information, and the application configuration information, whether to allow the application of the user equipment to access the network.

With reference to the first possible implementation manner, in a second possible implementation manner, that the processor is specifically configured to determine, according to a class of the user equipment, the user equipment class control information, and the application configuration information, whether to allow the application of the user equipment to access the network includes: an access layer of the processor sends the user equipment class control information to a protocol stack upper layer of the processor, and the protocol stack upper layer of the processor determines, according to the class of the user equipment, the user equipment class control information, and the application configuration information, whether to allow the application of the user equipment to access the network, where the class of the user equipment is stored at the protocol stack upper layer of the processor or is received from the access layer of the processor by the protocol stack upper layer of the processor; or an access layer of the processor determines, according to the class of the user equipment and the user equipment class control information, whether to allow the user equipment to access the network; in a case in which a protocol stack upper layer of the processor receives determining information that is sent by the access layer of the processor and that is used to instruct to allow the application of the user equipment to access the network, the protocol stack upper layer of the processor determines, according to the application configuration information, whether to allow the application of the user equipment to access the network; and in a case in which the protocol stack upper layer of the processor receives determining information that is sent by the access layer of the processor and that is used to prohibit the application of the user equipment from accessing the network, the protocol stack upper layer of the processor further prohibits the application of the user equipment from being allowed to access the network.

With reference to the seventh aspect, in a third possible implementation manner, the identification information of an application that is allowed to access the network is classified identification information of the application that is allowed to access the network, or the identification information of an application that is prohibited from accessing the network is classified identification information of the application that is prohibited from accessing the network, and correspondingly, the access control information includes classified control information; and the processor is specifically configured to determine, according to the application configuration information and the classified control information, whether to allow the application of the user equipment to access the network.

With reference to the third possible implementation manner, in a fourth possible implementation manner, that the processor is specifically configured to determine, according to the application configuration information and the classified control information, whether to allow the application of the user equipment to access the network includes: a protocol stack upper layer of the processor receives the classified control information that is sent by an access layer of the processor, and the protocol stack upper layer of the processor determines, according to the application configuration information and the classified control information, whether to allow the application of the user equipment to access the network.

With reference to the third possible implementation manner, in a fifth possible implementation manner, the access control information further includes user equipment class control information, and the processor is specifically configured to determine, according to a class of the user equipment, the user equipment class control information, the application configuration information, and the classified control information, whether to allow the application of the user equipment to access the network.

With reference to the fifth possible implementation manner, in a sixth possible implementation manner, that the processor is specifically configured to determine, according to a class of the user equipment, the user equipment class control information, the application configuration information, and the classified control information, whether to allow the application of the user equipment to access the network includes: a protocol stack upper layer of the processor receives the user equipment class control information and the classified control information that are sent by an access layer of the processor, and the protocol stack upper layer of the processor determines, according to the class of the user equipment, the user equipment class control information, the classified control information, and the application configuration information, whether to allow the application of the user equipment to access the network, where the class of the user equipment is stored at the protocol stack upper layer of the processor or is received from the access layer of the processor by the protocol stack upper layer of the processor; or an access layer of the processor determines, according to the class of the user equipment and the user equipment class control information, whether to allow the application of the user equipment to access the network; in a case in which a protocol stack upper layer of the processor receives determining information that is sent by the access layer of the processor and that is used to instruct to allow the application of the user equipment to access the network, the protocol stack upper layer of the processor determines, according to the application configuration information and the classified control information, whether to allow the application of the user equipment to access the network, where the classified control information is received from the access layer of the processor; and in a case in which the protocol stack upper layer of the processor receives determining information that is sent by the access layer of the processor and that is used to instruct to prohibit the application of the user equipment from accessing the network, the protocol stack upper layer of the processor further prohibits the application of the user equipment from being allowed to access the network.

With reference to any possible implementation manner of the third possible implementation manner to the sixth possible implementation manner, in a seventh possible implementation manner, the classified identification information of the application that is allowed to access the network is classified according to a priority, or the classified identification information of the application that is prohibited from accessing the network is classified according to a priority, and correspondingly, the classified control information received by the receiver is priority information; or the classified identification information of the application that is allowed to access the network is classified according to a congestion degree, or the classified identification information of the application that is prohibited from accessing the network is classified according to a congestion degree, and correspondingly, the classified control information received by the receiver is congestion degree information; or the classified identification information of the application that is allowed to access the network is classified according to an application group, or the classified identification information of the application that is prohibited from accessing the network is classified according to an application group, and correspondingly, the classified control information received by the receiver is group information of the application.

With reference to the seventh aspect or any one of the foregoing possible implementation manners, in an eighth possible implementation manner, the receiver is further configured to receive the application configuration information that is sent by a core network device; and the processor is specifically configured to determine the application configuration information received by the receiver as the application configuration information.

According to an eighth aspect, an embodiment of the present application provides an access network device, where the access network device includes: a processor, configured to determine that congestion occurs on a core network or an access network; and a transmitter, configured to: in a case in which the processor determines that congestion occurs on the core network or the access network, send access control information to user equipment, where the access control information includes classified control information or user equipment class control information, the classified control information is used to control a category of an application that accesses the network, and the user equipment class control information is used to control a class of user equipment that accesses the network and instruct the user equipment to use application configuration information.

With reference to the eighth aspect, in a first possible implementation manner, the access network device further includes: a receiver, configured to receive an access reference indicator that is sent by a core network device, where the access reference indicator is sent in a case in which congestion occurs on the core network, where the processor is further configured to: according to the access reference indicator received by the receiver, determine that congestion occurs on the core network and determine the access control information.

With reference to the eighth aspect, in a second possible implementation manner, the processor is further configured to: in a case in which the processor determines that congestion occurs on the access network, determine the access control information according to a congestion degree of the access network.

According to a ninth aspect, an embodiment of the present application provides a core network device. The core network device includes: a processor, configured to determine application configuration information, where the application configuration information includes identification information of an application that is allowed to access a network or identification information of an application that is prohibited from accessing a network; and a transmitter, configured to send, to user equipment, the application configuration information determined by the processor.

With reference to the ninth aspect, in a first possible implementation manner, the processor is further configured to determine an access reference indicator, where the access reference indicator includes user equipment class reference information, and the user equipment class reference information is used to provide reference information for controlling a class of user equipment that accesses the network; and the transmitter is further configured to send, to an access network device, the access reference indicator determined by the processor.

With reference to the ninth aspect, in a second possible implementation manner, the identification information of an application that is allowed to access the network is classified identification information of the application that is allowed to access the network, or the identification information of an application that is prohibited from accessing the network is classified identification information of the application that is prohibited from accessing the network; the processor is further configured to determine an access reference indicator, where the access reference indicator includes classified reference information, or the access reference indicator includes classified reference information and user class reference information, the classified reference information is used to provide reference information for controlling a category of an application that accesses the network, and the user equipment class control information is used to provide reference information for controlling a class of user equipment that accesses the network; and the transmitter is further configured to send, to an access network device, the access reference indicator determined by the processor.

According to the embodiments of the present application, in a case in which congestion occurs on a core network or an access network, an access network device sends access control information to user equipment, so that the user equipment determines, according to the access control information and application configuration information, an application that is allowed to access the network. In this way, applications about to access the network can be effectively reduced, thereby achieving an objective of alleviating a congestion status of the core network or the access network.

BRIEF DESCRIPTION OF THE DRAWINGS

For a more complete understanding of the present invention, and the advantages thereof, reference is now made to the following descriptions taken in conjunction with the accompanying drawings, in which.

To describe the technical solutions in the embodiments of the present application more clearly, the following briefly introduces the accompanying drawings required for describing the embodiments of the present application. Apparently, the accompanying drawings in the following description show merely some embodiments of the present application, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present application with reference to the accompanying drawings in the embodiments of the present application. Apparently, the described embodiments are merely some but not all of the embodiments of the present application. All other embodiments obtained by a person of ordinary skill in the art based on the embodiments of the present application without creative efforts shall fall within the protection scope of the present application.

It should be understood that the technical solutions of the embodiments of the present application may be applied to various communications systems, such as: a Global System for Mobile Communications (GSM), a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, LTE time division duplex (TDD), a Universal Mobile Telecommunications System (UMTS), or the like.

User equipment (UE), also referred to as a mobile terminal (MT), mobile user equipment, and the like, may communicate with one or more core networks by using a radio access network (RAN). The user equipment may be a mobile terminal, such as a mobile phone (also referred to as a "cellular" phone) and a computer with a mobile terminal. For example, the user equipment may be a portable, pocket-sized, handheld, computer built-in, or in-vehicle mobile apparatus.

An access network device may be a base station, may be an access point (AP), and the like. The base station may be a base station (BTS) in the GSM or CDMA, a base station (NodeB) in the WCDMA, or an eNB or e-NodeB in the LTE, which is not limited in the present application.

A core network device may be a mobility management entity (MME), or may be a serving GPRS support node (SGSN), which is not limited in the present application.

All applications mentioned in the present application are applications that need to establish a connection with a network to send or receive data in a running process, such as instant messaging software and clients of some websites (for example, a video website, a news website, and a forum).

Figure 1:
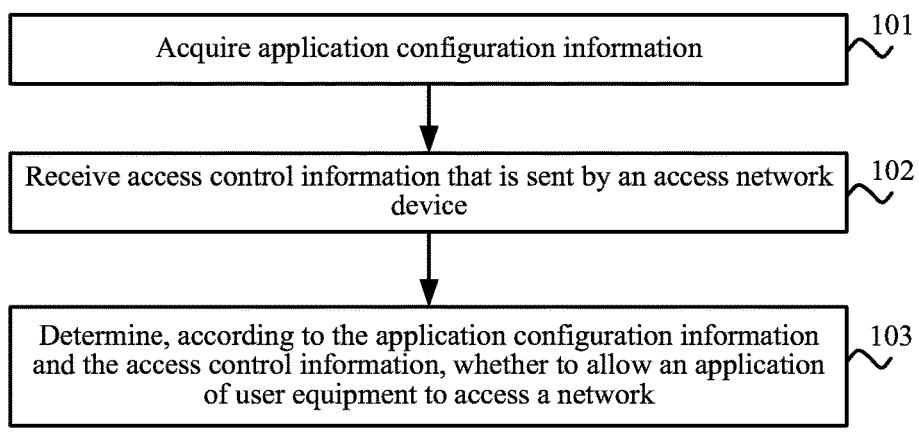
FIG. 1 is a schematic flowchart of a method for controlling access of an application to a network according to an embodiment of the present application.

FIG. 1 is a schematic flowchart of a method for controlling access of an application to a network according to an embodiment of the present application. The method shown in FIG. 1 is executed by user equipment.

101. Acquire application configuration information, where the application configuration information includes identification information of an application that is allowed to access a network or identification information of an application that is prohibited from accessing a network.

The acquiring application configuration information may be receiving application configuration information that is sent by a core network device. Specifically, the application configuration information may be sent to the user equipment by using Open Mobile Alliance Device Management (OMA DM), or may be sent to the user equipment by using non-access stratum (NAS) signaling. Alternatively, the application configuration information may also be preset in the user equipment.

102. Receive access control information that is sent by an access network device.

The access control information is used to limit a class of user equipment that accesses the network, or is used to limit a category of an application that accesses the network, or limit both a class of user equipment that accesses the network and a category of an application that accesses the network. For example, the access control information may be user equipment class control information, or may be classified control information, or may be user equipment class control information and classified control information.

The access control information may be sent to the user equipment by the access network device in a broadcast manner. For user equipment in connected mode, the access network device may send the access control information to the user equipment by using dedicated signaling.

103. Determine, according to the application configuration information and the access control information, whether to allow an application of the user equipment to access the network.

According to the embodiment shown in FIG. 1, the user equipment needs to determine, according to both the application configuration information and the access control information, whether to allow the application of the user equipment to access the network. In other words, the user equipment not only needs to determine whether the application of the user equipment satisfies a condition with which the application configuration information limits whether an application can access the network, but also needs to determine whether the application of the user equipment (and/or the user equipment) satisfies a condition with which the access control information limits whether an application (and/or the user equipment) can access the network. The application of the user equipment can access the network only when both the two restriction conditions are satisfied.

Optionally, as an embodiment, the access control information may include the user class control information, and the determining, according to the application configuration information and the access control information, whether to allow an application of the user equipment to access the network includes: determining, according to a class of the user equipment, the user equipment class control information, and the application configuration information, whether to allow the application of the user equipment to access the network. For example, in a case in which the user equipment class control information includes a class of user equipment that is allowed to access the network, if a class of the user equipment belongs to the class of the user equipment that is allowed to access the network, the application of the user equipment can access the network. Further, the class of the user equipment may be a class in an existing access class barring (ACB) mechanism, or may be a class that is set by an operator, for example, an operator may classify user equipment into different classes according to credit statuses.

Optionally, the determining, according to a class of the user equipment, the user equipment class control information, and the application configuration information, whether to allow the application of the user equipment to access the network includes: receiving, by a protocol stack upper layer of the user equipment, the user equipment class control information that is sent by an access layer of the user equipment, and determining, by the protocol stack upper layer according to the class of the user equipment, the user equipment class control information, and the application configuration information, whether to allow the application of the user equipment to access the network, where the class of the user equipment is stored at the protocol stack upper layer or is received from the access layer by the protocol stack upper layer. Specifically, if the class of the user equipment is a class in the ACB mechanism, the class of the user equipment is received from the access layer by the protocol stack upper layer. If the class of the user equipment is a class that is set by an operator, the class of the user equipment is stored at the protocol stack upper layer.

Optionally, the determining, according to a class of the user equipment, the user equipment class control information, and the application configuration information, whether to allow the application of the user equipment to access the network includes: determining, by an access layer of the user equipment according to the class of the user equipment and the user equipment class control information, whether to allow the application of the user equipment to access the network; in a case in which a protocol stack upper layer of the user equipment receives determining information that is sent by the access layer and that is used to instruct to allow the application of the user equipment to access the network, determining, by the protocol stack upper layer according to the application configuration information, whether to allow the application of the user equipment to access the network; and in a case in which the protocol stack upper layer of the user equipment receives determining information that is sent by the access layer and that is used to prohibit the application of the user equipment from accessing the network, prohibiting, by the protocol stack upper layer, the application of the user equipment from being allowed to access the network.

Optionally, as another embodiment, the identification information of an application that is allowed to access the network is classified identification information of the application that is allowed to access the network, or the identification information of an application that is prohibited from accessing the network is classified identification information of the application that is prohibited from accessing the network, and correspondingly, the access control information may include classified control information. The determining, according to the application configuration new information and the access control information, whether to allow an application of the user equipment to access the network includes: determining, according to the application configuration information and the classified control information, whether to allow the application of the user equipment to access the network. Specifically, the determining, according to the application configuration information and the classified control information, whether to allow the application of the user equipment to access the network includes: receiving, by a protocol stack upper layer of the user equipment, the classified control information that is sent by an access layer of the user equipment, and determining, by the protocol stack upper layer according to the application configuration information and the classified control information, whether to allow the application of the user equipment to access the network.

Further, the access control information may further include the user equipment control information. In this case, the determining, according to the application configuration information and the classified control information, whether to allow the application of the user equipment to access the network includes: determining, according to a class of the user equipment, the user equipment class control information, the application configuration information, and the classified control information, whether to allow the application of the user equipment to access the network. Optionally, the determining, according to a class of the user equipment, the user equipment class control information, the application configuration information, and the classified control information, whether to allow the application of the user equipment to access the network includes: receiving, by a protocol stack upper layer of the user equipment, the user equipment class control information and the classified control information that are sent by an access layer of the user equipment, and determining, by the protocol stack upper layer according to the class of the user equipment, the user equipment class control information, the classified control information, and the application configuration information, whether to allow the application of the user equipment to access the network, where the class of the user equipment is stored at the protocol stack upper layer or is received from the access layer by the protocol stack upper layer; or determining, by an access layer of the user equipment according to the class of the user equipment and the user equipment class control information, whether to allow the application of the user equipment to access the network; in a case in which a protocol stack upper layer receives determining information that is sent by the access layer and that is used to instruct to allow the application of the user equipment to access the network, determining, by the protocol stack upper layer according to the application configuration information and the classified control information, whether to allow the application of the user equipment to access the network, where the classified control information is received from the access layer; and in a case in which the protocol stack upper layer receives determining information that is sent by the access layer and that is used to instruct to prohibit the application of the user equipment from accessing the network, prohibiting, by the protocol stack upper layer, the application of the user equipment from being allowed to access the network.

Optionally, the classified identification information of the application that is allowed to access the network is classified according to a priority, or the classified identification information of the application that is prohibited from accessing the network is classified according to a priority, and correspondingly, the classified control information is priority information.

Optionally, the classified identification information of the application that is allowed to access the network is classified according to a congestion degree, or the classified identification information of the application that is prohibited from accessing the network is classified according to a congestion degree, and correspondingly, the classified control information is congestion degree information.

Optionally, the classified identification information of the application that is allowed to access the network is classified according to an application group, or the classified identification information of the application that is prohibited from accessing the network is classified according to an application group, and correspondingly, the classified control information is group information of the application.

Figure 2:
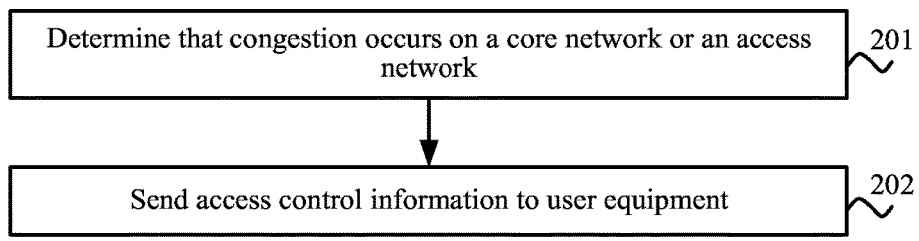
FIG. 2 is a schematic flowchart of a method for controlling access of an application to a network according to an embodiment of the present application.

FIG. 2 is a schematic flowchart of a method for controlling access of an application to a network according to an embodiment of the present application. The method shown in FIG. 2 is executed by an access network device, and can provide corresponding support of an access network device for the method in the embodiment shown in FIG. 1. The method includes the following steps.

201. Determine that congestion occurs on a core network or an access network.

202. Send access control information to user equipment, where the access control information is classified control information and/or user equipment class control information, the classified control information is used to control a category of an application that accesses the network, and the user equipment class control information is used to control a class of user equipment that accesses the network and instruct the user equipment to use application configuration information.

The access control information may be sent to the user equipment by the access network device in a broadcast manner. For user equipment in connected mode, the access network device may send the access control information to the user equipment by using dedicated signaling.

According to the embodiment shown in FIG. 2, in a case in which it is determined that congestion occurs on the core network or the access network, the access network device may send the access control information to the user equipment, to control a quantity of applications that access the network. In this way, the quantity of applications that access the network can be controlled, thereby achieving an objective of alleviating a congestion status of the core network or the access network.

Specifically, in a case in which congestion occurs on the core network, the access control information may be determined according to an access reference indicator that is received from a core network device. In a case in which congestion occurs on the access network, the access control information may be determined according to a congestion degree of the access network. The access network device may determine, in a case in which a radio resource is insufficient, that congestion occurs on the access network, or determine, in a case in which a central processing unit, a memory, or the like is occupied to a great extent, that congestion occurs on the access network.

Specifically, the classified control information includes any one of the following: priority information, congestion degree information, and group information of the application. For a method for using each type of classified control information, reference may be made to the corresponding description in the embodiment shown in FIG. 1, and details are not described herein again.

Figure 3:
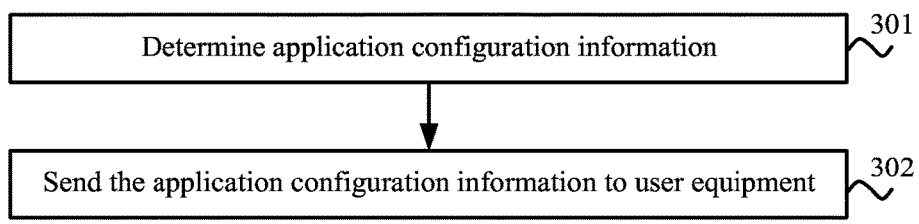
FIG. 3 is a schematic flowchart of a method for controlling access of an application to a network according to an embodiment of the present application.

FIG. 3 is a schematic flowchart of a method for controlling access of an application to a network according to an embodiment of the present application. The method shown in FIG. 3 is executed by a core network device, and can provide corresponding support of a core network device for the methods in the embodiments shown in FIG. 1 and FIG. 2. The method includes the following steps.

301. Determine application configuration information, where the application configuration information includes identification information of an application that is allowed to access a network or identification information of an application that is prohibited from accessing a network.

Specifically, the identification information may be an identifier of a specific application (for example, WeChat), or may be a company to which an application belongs, or may be an attribute of an application (for example, a video application, an instant messaging application, or a news application), or the like. Further, the identification information of an application that is allowed to access the network may further be classified identification information of an application that is allowed to access a network, or classified identification information of an application that is prohibited from accessing a network. Identification information of an application may be classified by using a priority, a congestion degree, and an application group. The identification information and a classification manner in the application configuration information are set on the side of the core network device in a preset manner. In other words, the application configuration information is determined by the core network device in preset configuration. In addition, the classification manner in the application configuration information is in a one-to-one correspondence with category in classified control information sent by an access network device. For example, if the identification information of the application is classified by using a priority, the classified control information is priority information.

302. Send the application configuration information to user equipment.

Specifically, the application configuration information may be sent to the user equipment by using Open Mobile Alliance Device Management (OMA DM), or may be sent to the user equipment by using non-access stratum (NAS) signaling.

According to the embodiment shown in FIG. 3, the core network device may set the application configuration information and send the application configuration information to the user equipment, so that the user equipment may determine, according to the application configuration information, whether to allow an application to access the network. In this way, a congestion status of a network can be alleviated by controlling access of an application to the network.

Optionally, as an embodiment, the method further includes: determining an access reference indicator, where the access reference indicator includes user equipment class reference information, and the user equipment class reference information is used to provide reference information for controlling a class of user equipment that accesses the network; and sending the access reference indicator to an access network device. The access reference indicator is determined by the core network device according to a congestion degree of a core network. For example, the core network device may determine, in a case of high usage of a central processing unit, a memory, or the like, that congestion occurs. The access reference indicator may be sent to the access network device by using control-plane signaling (which may be, for example, control-plane signaling through an S1 interface).

Optionally, as another embodiment, the identification information of an application that is allowed to access the network is classified identification information of the application that is allowed to access the network, or the identification information of an application that is prohibited from accessing the network is classified identification information of the application that is prohibited from accessing the network; and the method further includes: determining an access reference indicator, where the access reference indicator includes classified reference information, or the access reference indicator includes classified reference information and user class reference information, the classified reference information is used to provide reference information for controlling a category of an application that accesses the network, and the user equipment class control information is used to provide reference information for controlling a class of user equipment that accesses the network; and sending the access reference indicator to an access network device. The access reference indicator is determined by the core network device according to a congestion degree of a core network. The access reference indicator may be sent to the access network device by using control-plane signaling (which may be, for example, control-plane signaling through an S1 interface).

Figure 4:
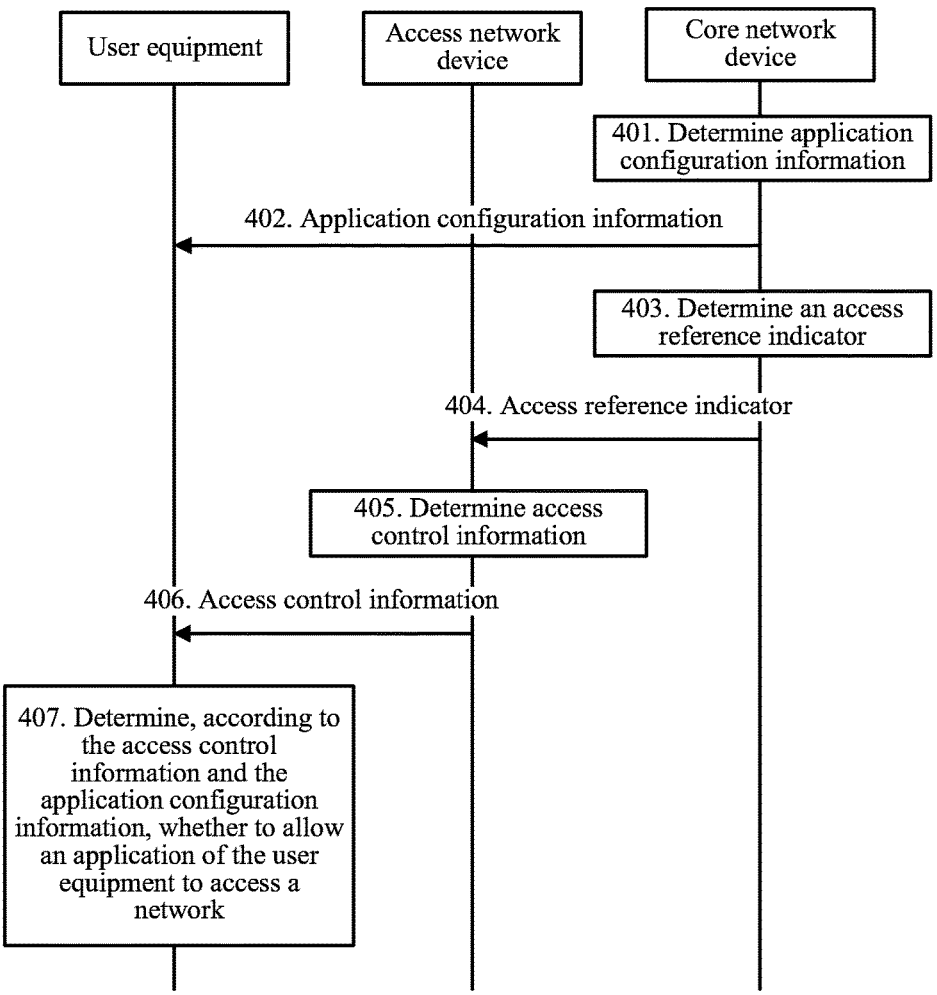
FIG. 4 is a schematic diagram of a method for controlling access of an application to a network according to an embodiment of the present application.

FIG. 4 is a schematic diagram of a method for controlling access of an application to a network according to an embodiment of the present application. FIG. 4 shows a comprehensive embodiment of FIG. 1 to FIG. 3.

401. A core network device determines application configuration information, where the application configuration information includes identification information of an application that is allowed to access a network or identification information of an application that is prohibited from accessing a network, the identification information of an application that is allowed to access the network may also be referred to as an application whitelist, and the identification information of an application that is prohibited from accessing the network may also be referred to as an application blacklist.

Specifically, the identification information may be an identifier of a specific application (for example, WeChat), or may be a company to which an application belongs, or may be an attribute of an application (for example, a video application, an instant messaging application, or a news application), or the like.

Further, the identification information of an application that is allowed to access the network may further be classified identification information of an application that is allowed to access a network, or classified identification information of an application that is prohibited from accessing a network. Identification information of an application may be classified by using a priority, a congestion degree, and an application group. For example, Table 1 shows a specific example in which identification information of an application that is allowed to access a network is classified according to a priority. It should be noted that the example in Table 1 is only for the purpose of helping to better understand the present application, and does not intend to limit the present application.

TABLE 1

| Identification information of an application | Priority |
|---|---|
| A | Priority 1 |
| A and B | Priority 2 |
| A, B, and C | Priority 3 |

As can be seen from Table 1, priority 1 corresponds to an application whose identification information is A, priority 2 corresponds to the application whose identification information is A and an application whose identification information is B, and priority 3 corresponds to the application whose identification information is A, the application whose identification information is B, and an application whose identification information is C.

Table 2 shows a specific example in which identification information of an application that is allowed to access a network is classified according to a congestion degree. It should be noted that the example in Table 2 is only for the purpose of helping to better understand the present application, and does not intend to limit the present application.

TABLE 2

| Identification information of an application | Congestion degree |
|---|---|
| A | Level 1 |
| B | Level 2 |
| C | Level 3 |

As can be seen from Table 2, a congestion degree level 1 corresponds to an application whose identification information is A, a congestion degree level 2 corresponds to an application whose identification information is B, and a congestion degree level 3 corresponds to an application whose identification information is C, where the level 1 indicates that a network congestion degree is high, the level 2 indicates that a network congestion degree is medium, and the level 3 indicates that a network congestion degree is low.

Table 3 shows a specific example in which identification information of an application that is allowed to access a network is classified according to an application group. It should be noted that the example in Table 3 is only for the purpose of helping to better understand the present application, and does not intend to limit the present application.

TABLE 3

| Identification information of an application | Application group |
|---|---|
| A | Groups 1, 2, and 3 |
| B | Groups 2 and 3 |
| C | Group 3 |

As can be seen from Table 3, an application whose identification information is A belongs to a group 1, a group 2, and a group 3, an application whose identification information is B belongs to the group 2 and the group 3, and an application whose identification information is C belongs only to the group 3.

402. The core network device sends the application configuration information to user equipment. The application configuration information may be sent to the user equipment by using Open Mobile Alliance Device Management (OMA DM), or may be sent to the user equipment by using non-access stratum (NAS) signaling. Specifically, the application configuration information is sent to a protocol stack upper layer of the user equipment, and the protocol stack upper layer includes an application layer and a non-access stratum.

It may be understood that the application configuration information may also be preset in the user equipment. In this case, step 401 and step 402 do not need to be performed. The user equipment may acquire the application configuration information by directly reading the preset application configuration information.

Step 403 and step 404 are optional steps, and are performed in a case in which congestion occurs on a core network.

403. The core network device determines an access reference indicator according to a congestion degree of a core network.

Optionally, as an embodiment, the access reference indicator may include user class reference information, and the user class reference information is used to provide reference information for controlling a class of user equipment that accesses the network. Specifically, the user equipment class reference information may provide a reference class of user equipment that is allowed to access a network, or a reference class of user equipment that is prohibited from accessing a network.

Optionally, as another embodiment, in a case in which the application configuration information includes classified identification information of the application that is allowed to access the network or classified identification information of the application that is prohibited from accessing the network, the access reference indicator may include classified reference information, where the classified reference information is used to provide reference information for controlling a category of an application that accesses the network. For example, the classified reference information may include: a reference priority, a reference congestion degree, or a reference user group. Specifically, if identification information of an application is classified according to a priority, the classified reference information is a reference priority. In the example in Table 1, the classified reference information may include the priority 1, the priority 2, and the priority 3. If identification information of an application is classified according to a congestion degree, the classified reference information is a reference congestion degree. In the example in Table 2, the classified reference information may include the level 1, the level 2, or the level 3. If identification information of an application is classified according to an application group, the classified reference information is a reference application group. In the example in Table 3, the classified reference information includes the group 1, the group 2, and the group 3. Further, the access reference indicator may further include user equipment class reference information, that is, the access reference indicator includes user equipment class reference information and classified reference information.

404. The core network device sends the access reference indicator to an access network device. In a case in which the access network device receives the access reference indicator sent by the core network device, the access network device determines that congestion occurs on the core network.

405. The access network device determines access control information. Specifically, in a case in which step 403 and step 404 are performed, the access network device determines the access control information with reference to the access reference indicator. Alternatively, in a case in which step 403 and step 404 are not performed, the access network device may determine the access control information according to a congestion degree of an access network.

Optionally, as an embodiment, the access control information may include user class control information, where the user class control information is used to control a class of user equipment that accesses the network and instruct the user equipment to determine, according to the application configuration information, whether to allow an application to access the network. Specifically, the user equipment class control information classifies user equipment into user equipment that is allowed to access a network, and user equipment that is prohibited from accessing a network. The user equipment that is allowed to access the network may be referred to as a user equipment whitelist, and the user equipment that is prohibited from accessing the network may be referred to as a user equipment blacklist. The class of the user equipment may be a class in an existing access class barring (ACB) mechanism, or may be a class that is set by an operator, for example, an operator may classify user equipment into different classes according to credit statuses. Therefore, a user equipment class in the user equipment class control information may correspond to a class in the ACB mechanism, or may correspond to a user equipment class that is set by an operator.

Optionally, as another embodiment, the application configuration information includes classified identification information of the application that is allowed to access the network or classified identification information of the application that is prohibited from accessing the network, and the access control information may include classified control information, where the classified control information is used to control a category of an application that accesses the network. The classified control information is consistent with a classification manner of the identification information of the application that is allowed to access the network (or the identification information of the application that is prohibited from accessing the network). When the access network device and the core network device are configured, it is configured that the classified control information determined by the access network device is the same as a classification manner of identification information of an application by the core network device. For example, the classified control information may be priority information, congestion degree information, or group information of a user. Specifically, the classified identification information of the application that is allowed to access the network is classified according to a priority, or the classified identification information of the application that is prohibited from accessing the network is classified according to a priority, and correspondingly, the classified control information is priority information. In the example in Table 1, the classified control information may be the priority 1, or the priority 2, or the priority 3. The classified identification information of the application that is allowed to access the network is classified according to a congestion degree, or the classified identification information of the application that is prohibited from accessing the network is classified according to a congestion degree, and correspondingly, the classified control information is congestion degree information. In the example in Table 2, the classified control information may be the level 1, or the level 2, or the level 3. The classified identification information of the application that is allowed to access the network is classified according to an application group, or the classified identification information of the application that is prohibited from accessing the network is classified according to an application group, and correspondingly, the classified control information is group information of the application. In the example in Table 3, the classified control information may be the group 1, or the group 2, or the group 3. Further, the access control information may further include user equipment class control information, that is, the access control information includes user equipment class control information and classified control information.

In a case in which the access network device determines the access control information with reference to the access reference indicator, the access control information may correspond to the access reference indicator, and the access control information may also not correspond to the access reference indicator. For example, if the access reference indicator is classified reference information and the classified reference information is a reference priority, the access control information may be priority information, or may be other information such as group information of the application. Further, in a case in which the access reference indicator is a reference priority and the access control information is priority information, the priority information in the access control information may be equal to or may be unequal to the reference priority in the access reference indicator.

406. The access network device sends the access control information to user equipment. The access control information may be broadcast by using a system broadcast message, or in a case in which the user equipment is in connected mode, the access control information may be sent to the user equipment by using dedicated signaling. Specifically, in a case in which an access layer of the user equipment receives the access control information, the access layer of the user equipment sends the access control information to a protocol stack upper layer. If the access control information includes user equipment class control information, and the user equipment class control information is determined according to the ACB mechanism, the access layer also sends the user equipment class control information (that is, a user equipment class in the ACB mechanism) to the protocol stack upper layer. Further, receiving, by the user equipment, the access control information, or feeding back, by the access layer, the access control information to the protocol stack upper layer is controlled by the protocol stack upper layer. Specifically, triggered by an application, the protocol stack upper layer initiates, to the access layer, a request for acquiring the access control information. The access layer reads, according to the request of the protocol stack upper layer, the broadcast information that is sent by the access network device and that includes the access control information, and feeds back the read access control information to the protocol stack upper layer.

Optionally, when the access network device sends the access control information to the user equipment, the access network device may further send a congestion control indicator to the user equipment, to notify the user equipment that it may be determined, according to the access control information and the application configuration information, whether to allow an application to access the network. In addition, the user equipment may also determine, in a case in which the user equipment receives the access control information, that it may be determined, according to the access control information and the application configuration information, whether to allow an application to access the network.

407. The user equipment determines, according to the access control information and the application configuration information, whether to allow an application of the user equipment to access the network.

The access control information includes the user equipment class control information, and in this case, the determining, by the user equipment according to the access control information and the application configuration information, whether to allow an application of the user equipment to access the network includes: determining, by the user equipment according to a class of the user equipment, the class control information, and the application configuration information, whether to allow the application of the user equipment to access the network. For example, it is assumed that the class control information is a user equipment whitelist and the application configuration information is an application whitelist. The user equipment first needs to determine whether the class of the user equipment is in the user equipment whitelist. If the class of the user equipment is in the user equipment whitelist, the user equipment continues to perform determining on the application of the user equipment according to the application configuration information. If identification information of the application of the user equipment is in the application whitelist, the application is allowed to access the network; if the identification information of the application of the user equipment is not in the application whitelist, the application of the user equipment is prohibited from accessing the network. If the class of the user equipment is not in the user equipment whitelist, the user equipment directly prohibits the application of the user equipment from accessing the network. A determining method used when the class control information is a user equipment blacklist and/or the application configuration information is an application blacklist is similar, and does not need to be described in detail herein.

Optionally, as an embodiment, the determining, by the user equipment according to a class of the user equipment, the class control information, and the application configuration information, whether to allow the application of the user equipment to access the network includes: receiving, by a protocol stack upper layer of the user equipment, the user equipment class control information that is sent by an access layer of the user equipment, and determining, by the protocol stack upper layer according to the class of the user equipment, the user equipment class control information, and the application configuration information, whether to allow the application of the user equipment to access the network, where the class of the user equipment is stored at the protocol stack upper layer or the class of the user equipment is received from the access layer. If the class of the user equipment is a class in the ACB mechanism, the class of the user equipment is received from the access layer. If the class of the user equipment is a class that is set by an operator, the class of the user equipment may be stored at the protocol stack upper layer.

Optionally, as another embodiment, the determining, by the user equipment according to a class of the user equipment, the class control information, and the application configuration information, whether to allow the application of the user equipment to access the network includes: determining, by an access layer of the user equipment according to the class of the user equipment and the user equipment class control information, whether to allow the application of the user equipment to access the network; in a case in which a protocol stack upper layer of the user equipment receives determining information that is sent by the access layer and that is used to instruct to allow the application of the user equipment to access the network, determining, by the protocol stack upper layer according to the application configuration information, whether to allow the application of the user equipment to access the network; and in a case in which the protocol stack upper layer receives determining information that is sent by the access layer and that is used to instruct to prohibit the application of the user equipment from accessing the network, prohibiting, by the protocol stack upper layer, the application of the user equipment from being allowed to access the network. In other words, the access layer first determines, according to the class of the user equipment, whether to allow the application of the user equipment to access the network, and the protocol stack upper layer then further determines whether to allow the application of the user equipment to access the network.

The access control information includes the classified control information, and in this case, the determining, by the user equipment according to the access control information and the application configuration information, whether to allow an application of the user equipment to access the network includes: determining, according to the application configuration information and the classified control information, whether to allow the application of the user equipment to access the network. In this case, the application configuration information includes the classified identification information of the application that is allowed to access the network or the classified identification information of the application that is prohibited from accessing the network. For example, it is assumed that the application configuration information is an application whitelist. The user equipment first needs to determine whether the identification information of the application is in the application whitelist, and if the identification information of the application is in the application whitelist, the user equipment continues to determine, according to the classified control information, whether to allow the application to access the network. A determining method used when the application configuration information is an application blacklist is similar, and does not need to be described in detail herein.

Specifically, the determining, according to the application configuration information and the classified control information, whether to allow the application of the user equipment to access the network includes: receiving, by a protocol stack upper layer of the user equipment, the classified control information that is sent by an access layer, and determining, by the protocol stack upper layer according to the application configuration information and the classified control information, whether to allow the application of the user equipment to access the network. Using Table 1 as an example, the classified control information should be a priority. If the classified control information is the priority 3, all the applications whose identification information is A, B, and C respectively can access the network. If the classified control information is the priority 1, only the application whose identification information is A can access the network. Using Table 2 as an example, the classified control information should be congestion degree information. If the classified control information is the level 3, all the applications whose identification information is A, B, and C respectively can access the network. If the classified control information is the level 1, only the application whose identification information is A can access the network. Using Table 3 as an example, the classified control information should be group information of the application. If the classified control information is the group 3, all the applications whose identification information is A, B, and C respectively can access the network. If the classified control information is the group 1, only the application whose identification information is A can access the network. In addition, in the examples in Table 1 to Table 3, assuming that there are applications whose identification information is not A, B, or C (for example, an application whose identification information is D), none of these applications can access the network because the identification information of these applications is not in Table 1 to Table 3.

The access control information is the user equipment class control information and the classified control information, and in this case, the determining, by the user equipment according to the access control information and the application configuration information, whether to allow an application of the user equipment to access the network includes: determining, according to a class of the user equipment, the user equipment class control information, the application configuration information, and the classified control information, whether to allow the application of the user equipment to access the network. For example, it is assumed that the class control information is a user equipment whitelist and the application configuration information is an application whitelist. The user equipment first needs to determine, according to the class control information, whether the class of the user equipment is in the user equipment whitelist. If the class of the user equipment is in the user equipment whitelist, the user equipment continues to determine, according to the application configuration information, whether the identification information of the application of the user equipment is in the application whitelist. If the class of the user equipment is not in the user equipment whitelist, the user equipment directly prohibits the application of the user equipment from accessing the network. If the identification information of the application is in the application whitelist, the user equipment continues to determine, according to the classified control information, whether to allow the application to access the network. If the identification information of the application is not in the application whitelist, the user equipment directly prohibits the application from accessing the network. A determining method used when the class control information is a user equipment blacklist and/or the application configuration information is an application blacklist is similar, and does not need to be described in detail herein.

Optionally, as an embodiment, the determining, according to a class of the user equipment, the user equipment class control information, the application configuration information, and the classified control information, whether to allow the application of the user equipment to access the network includes: receiving, by a protocol stack upper layer of the user equipment, the user equipment class control information that is sent by an access layer of the user equipment, and determining, by the protocol stack upper layer according to the class of the user equipment, the user equipment class control information, the application configuration information, and the classified control information, whether to allow the application of the user equipment to access the network, where the class of the user equipment is stored at the protocol stack upper layer or the class of the user equipment is received from the access layer. If the class of the user equipment is a class in the ACB mechanism, the class of the user equipment is received from the access layer. If the class of the user equipment is a class that is set by an operator, the class of the user equipment may be stored at the protocol stack upper layer.

Optionally, as another embodiment, the determining, according to a class of the user equipment, the user equipment class control information, the application configuration information, and the classified control information, whether to allow the application of the user equipment to access the network includes: determining, by an access layer of the user equipment according to the class of the user equipment and the user equipment class control information, whether to allow the application of the user equipment to access the network; in a case in which a protocol stack upper layer of the user equipment receives determining information that is sent by the access layer and that is used to instruct to allow the application of the user equipment to access the network, determining, by the protocol stack upper layer according to the application configuration information and the classified control information, whether to allow the application of the user equipment to access the network; and in a case in which the protocol stack upper layer receives determining information that is sent by the access layer and that is used to instruct to prohibit the application of the user equipment from accessing the network, prohibiting, by the protocol stack upper layer, the application of the user equipment from being allowed to access the network. In other words, the access layer first determines, according to the class of the user equipment, whether to allow the application of the user equipment to access the network, and the protocol stack upper layer then further determines whether to allow the application of the user equipment to access the network.

If it is determined that the application of the user equipment is allowed to access the network, the protocol stack upper layer normally initiates the application. If the user equipment is in idle mode, the protocol stack upper layer first requests to the access layer for radio resource control (RRC) connection establishment, so that the terminal is switched to the connected mode, and then initiates a service.

According to the embodiment shown in FIG. 4, in a case in which congestion occurs on a core network or an access network, an access network device sends access control information to user equipment, so that the user equipment determines, according to the access control information and application configuration information, an application that is allowed to access the network. In this way, applications about to access the network can be effectively reduced, thereby achieving an objective of alleviating a congestion status of the core network or the access network. In addition, when the application configuration information is determined on the core network, applications may be classified according to an actual status (for example, a profit status and a resource usage status) of the applications. In the examples in Table 1 to Table 3, if the priorities, the congestion levels, and the application groups corresponding to the applications are classified according to profit statuses of the applications (for example, the application whose identification information is A brings in the highest profit for an operator, and the application whose identification information is C brings in the lowest profit for the operator), in a case in which congestion occurs on a network, corresponding access control information may be set to achieve objectives of alleviating network congestion and ensuring that the operator can obtain a high profit. For another example, if the priorities, the congestion levels, and the application groups corresponding to the applications are classified according to resource usage statuses of the applications (for example, the application whose identification information is A occupies fewest resources, and the application whose identification information is C occupies most resources), in a case in which congestion occurs on a network, corresponding access control information may be set to effectively alleviate a congestion status of the network.

Figure 5:
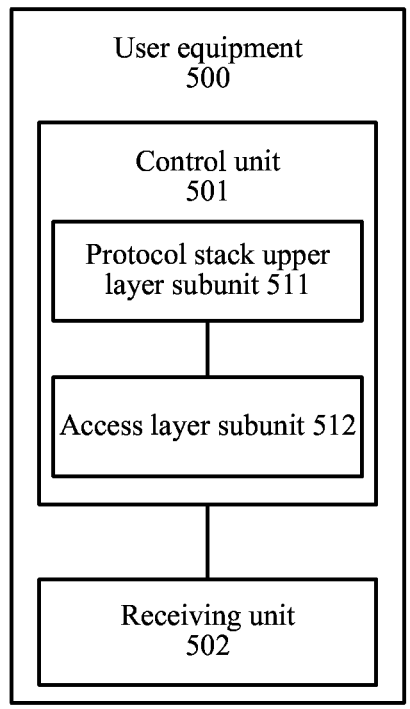
FIG. 5 is a block diagram of a structure of user equipment according to an embodiment of the present application.

FIG. 5 is a block diagram of a structure of user equipment according to an embodiment of the present application. User equipment 500 shown in FIG. 5 can execute the steps executed by the user equipment in FIG. 1 or FIG. 4. As shown in FIG. 5, the user equipment 500 includes a control unit 501 and a receiving unit 502.

The control unit 501 is configured to acquire application configuration information, where the application configuration information includes identification information of an application that is allowed to access a network or identification information of an application that is prohibited from accessing a network. Specifically, the receiving unit 502 may be configured to receive the application configuration information that is sent by a core network device. The application configuration information may be sent to the user equipment by the core network device by using Open Mobile Alliance Device Management (OMA DM), or may be sent to the user equipment by the core network device by using non-access stratum (NAS) signaling. The control unit 501 is specifically configured to determine the application configuration information received by the receiving unit 502 as the application configuration information. Alternatively, the control unit 501 may acquire application configuration information preconfigured in the user equipment 500, and determine the preconfigured application configuration information as the application configuration information.

The receiving unit 502 is configured to receive access control information that is sent by an access network device. Specifically, the access control information received by the receiving unit 502 may be broadcast by the access network device. Alternatively, when the user equipment 500 is in connected mode, the receiving unit 502 receives the access control information from the access network device by using dedicated signaling.

The control unit 501 is further configured to determine, according to the application configuration information and the access control information, whether to allow an application of the user equipment 500 to access the network.

The user equipment 500 shown in FIG. 5 needs to determine, according to both the application configuration information and the access control information, whether to allow the application of the user equipment to access the network. In other words, the user equipment 500 not only needs to determine whether the application of the user equipment satisfies a condition with which the application configuration information limits whether an application can access the network, but also needs to determine whether the application of the user equipment (and/or the user equipment) satisfies a condition with which the access control information limits whether an application (and/or the user equipment) can access the network. The application of the user equipment can access the network only when both the two restriction conditions are satisfied.

Further, the access control information may include user equipment class control information and classified control information.

Optionally, as an embodiment, the access control information includes the user equipment class control information, and the control unit 501 is specifically configured to determine, according to a class of the user equipment, the user equipment class control information, and the application configuration information, whether to allow the application of the user equipment to access the network. Specifically, the control unit 501 includes a protocol stack upper layer subunit 511 and an access layer subunit 512.

Optionally, the determining, according to a class of the user equipment, the user equipment class control information, and the application configuration information, whether to allow the application of the user equipment to access the network includes: the protocol stack upper layer subunit 511 is configured to receive the user equipment class control information that is sent by the access layer subunit 512, and determine, according to the class of the user equipment, the user equipment class control information, and the application configuration information, whether to allow the application of the user equipment to access the network, where the class of the user equipment is stored in the protocol stack upper layer subunit 511 or is received from the access layer subunit 512 by the protocol stack upper layer subunit 511.

Optionally, the determining, according to a class of the user equipment, the user equipment class control information, and the application configuration information, whether to allow the application of the user equipment to access the network includes: the access layer subunit 512 is configured to determine, according to the class of the user equipment and the user equipment class control information, whether to allow the application of the user equipment to access the network; the protocol stack upper layer subunit 511 is configured to: in a case in which determining information that is sent by the access layer subunit 512 and that is used to instruct to allow the application of the user equipment to access the network is received, determine, according to the application configuration information, whether to allow the application of the user equipment to access the network; and the protocol stack upper layer subunit 511 is further configured to: in a case in which determining information that is sent by the access layer subunit 512 and that is used to prohibit the application of the user equipment from accessing the network is received, prohibit the application of the user equipment from being allowed to access the network.

Optionally, as another embodiment, the identification information of an application that is allowed to access the network is classified identification information of the application that is allowed to access the network, or the identification information of an application that is prohibited from accessing the network is classified identification information of the application that is prohibited from accessing the network, and correspondingly, the access control information includes classified control information; and the control unit 501 is specifically configured to determine, according to the application configuration information and the classified control information, whether to allow the application of the user equipment to access the network. In this case, the identification information of the application that is allowed to access the network is classified identification information of the application that is allowed to access the network, or the identification information of the application that is prohibited from accessing the network is classified identification information of the application that is prohibited from accessing the network. Specifically, the control unit 501 includes a protocol stack upper layer subunit 511 and an access layer subunit 512. The determining, according to the application configuration information and the classified control information, whether to allow the application of the user equipment to access the network includes: the protocol stack upper layer subunit 511 is configured to receive the classified control information that is sent by the access layer subunit 512, and the protocol stack upper layer subunit 511 is further configured to determine, according to the application configuration information and the classified control information, whether to allow the application of the user equipment to access the network.

Further, the access control information may further include user equipment class control information, and the control unit 501 is specifically configured to determine, according to a class of the user equipment, the user equipment class control information, the application configuration information, and the classified control information, whether to allow the application of the user equipment to access the network. In this case, the identification information of the application that is allowed to access the network is classified identification information of the application that is allowed to access the network, or the identification information of the application that is prohibited from accessing the network is classified identification information of the application that is prohibited from accessing the network. Specifically, the control unit 501 includes a protocol stack upper layer subunit 511 and an access layer subunit 512.

Optionally, the determining, according to a class of the user equipment, the user equipment class control information, the application configuration information, and the classified control information, whether to allow the application of the user equipment to access the network includes: the protocol stack upper layer subunit 511 is configured to receive the user equipment class control information and the classified control information that are sent by the access layer subunit 512, and the protocol stack upper layer subunit 511 is further configured to determine, according to the class of the user equipment, the user equipment class control information, the classified control information, and the application configuration information, whether to allow the application of the user equipment to access the network, where the class of the user equipment is stored in the protocol stack upper layer subunit 511 or is received from the access layer subunit 512 by the protocol stack upper layer subunit 511.

Optionally, the determining, according to a class of the user equipment, the user equipment class control information, the application configuration information, and the classified control information, whether to allow the application of the user equipment to access the network includes: the access layer subunit 512 is configured to determine, according to the class of the user equipment and the user equipment class control information, whether to allow the application of the user equipment to access the network; the protocol stack upper layer subunit 511 is configured to: in a case in which determining information that is sent by the access layer subunit 512 and that is used to instruct to allow the application of the user equipment to access the network is received, determine, according to the application configuration information and the classified control information, whether to allow the application of the user equipment to access the network, where the classified control information is received from the access layer subunit 512; and the protocol stack upper layer subunit 511 is further configured to: in a case in which determining information that is sent by the access layer subunit 512 and that is used to instruct to prohibit the application of the user equipment from accessing the network is received, prohibit the application of the user equipment from being allowed to access the network.

Further, the classified identification information of the application that is allowed to access the network is classified according to a priority, or the classified identification information of the application that is prohibited from accessing the network is classified according to a priority, and correspondingly, the classified control information received by the receiving unit 502 is priority information. The classified identification information of the application that is allowed to access the network is classified according to a congestion degree, or the classified identification information of the application that is prohibited from accessing the network is classified according to a congestion degree, and correspondingly, the classified control information received by the receiving unit 502 is congestion degree information. The classified identification information of the application that is allowed to access the network is classified according to an application group, or the classified identification information of the application that is prohibited from accessing the network is classified according to an application group, and correspondingly, the classified control information received by the receiving unit 502 is group information of the application.

Figure 6:
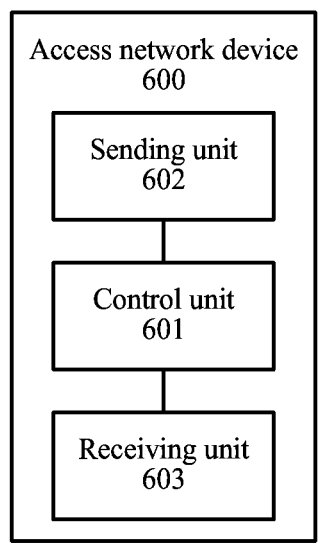
FIG. 6 is a block diagram of a structure of an access network device according to an embodiment of the present application.

FIG. 6 is a block diagram of a structure of an access network device according to an embodiment of the present application. An access network device 600 shown in FIG. 6 can execute the steps executed by the access network device in FIG. 2 or FIG. 4. As shown in FIG. 6, the access network device 600 includes a control unit 601 and a sending unit 602.

The control unit 601 is configured to determine that congestion occurs on a core network or an access network.

The sending unit 602 is configured to: in a case in which the control unit 601 determines that congestion occurs on the access network or the core network, send access control information to user equipment, where the access control information includes classified control information or user equipment class control information, the classified control information is used to control a category of an application that accesses the network, and the user equipment class control information is used to control a class of user equipment that accesses the network and instruct the user equipment to use application configuration information.

Specifically, the sending unit 602 may broadcast the access control information in a broadcast manner. For user equipment in connected mode, the sending unit 602 may send the access control information to the user equipment by using dedicated signaling.

In a case in which it is determined that congestion occurs on the core network or the access network, the access network device 600 shown in FIG. 6 may send the access control information to the user equipment, to control a quantity of applications that access the network. In this way, the quantity of applications that access the network can be controlled, thereby achieving an objective of alleviating a congestion status of the core network or the access network.

Further, the access network device 600 further includes a receiving unit 603, configured to receive an access reference indicator that is sent by a core network device. The control unit 601 is further configured to: according to the access reference indicator received by the receiving unit 603, determine that congestion occurs on the core network and determine the access control information.

Further, the control unit 601 is further configured to: in a case in which the control unit 601 determines that congestion occurs on the access network, determine the access control information according to a congestion degree of the access network. Specifically, the control unit 601 may determine, in a case in which a radio resource is insufficient, that congestion occurs on the access network, or determine, in a case in which a central processing unit, a memory, or the like is occupied to a great extent, that congestion occurs on the access network.

Figure 7:
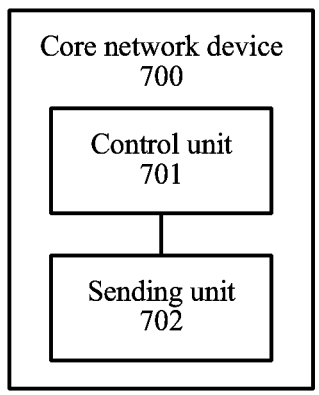
FIG. 7 is a block diagram of a structure of a core network device according to an embodiment of the present application.

FIG. 7 is a block diagram of a structure of a core network device according to an embodiment of the present application. A core network device 700 shown in FIG. 7 can execute the steps executed by the core network device in FIG. 3 or FIG. 4. As shown in FIG. 7, the core network device 700 includes a control unit 701 and a sending unit 702.

The control unit 701 is configured to determine application configuration information, where the application configuration information includes identification information of an application that is allowed to access a network or identification information of an application that is prohibited from accessing a network.

Specifically, the identification information may be an identifier of a specific application (for example, WeChat), or may be a company to which an application belongs, or may be an attribute of an application (for example, a video application, an instant messaging application, or a news application), or the like. Further, the identification information of an application that is allowed to access the network may further be classified identification information of an application that is allowed to access a network, or classified identification information of an application that is prohibited from accessing a network. Identification information of an application may be classified by using a priority, a congestion degree, and an application group. The identification information and a classification manner in the application configuration information are set on the side of the core network device in a preset manner. In other words, the application configuration information is determined by the control unit 701 in preset configuration. In addition, the classification manner in the application configuration information is in a one-to-one correspondence with classification in classified control information sent by an access network device. For example, if the identification information of the application is classified by using a priority, the classified control information is priority information.

The sending unit 702 is configured to send, to user equipment, the application configuration information determined by the control unit 701. Specifically, the sending unit 702 may send the application configuration information to the user equipment by using Open Mobile Alliance Device Management (OMA DM), or may send the application configuration information to the user equipment by using non-access stratum (NAS) signaling.

The core network device 700 shown in FIG. 7 may set the application configuration information and send the application configuration information to the user equipment, so that the user equipment may determine, according to the application configuration information, whether to allow an application to access the network. In this way, a congestion status of a network can be alleviated by controlling access of an application to the network.

Optionally, as an embodiment, the control unit 701 may be further configured to determine an access reference indicator, where the access reference indicator includes user equipment class reference information, and the user equipment class reference information is used to provide reference information for controlling a class of user equipment that accesses the network. The sending unit 702 may be further configured to send, to an access network device, the access reference indicator determined by the control unit 701. Specifically, the sending unit 702 may send the access reference indicator to the access network device by using control-plane signaling (which may be, for example, control-plane signaling through an S1 interface).

Optionally, as another embodiment, the identification information of an application that is allowed to access the network is classified identification information of the application that is allowed to access the network, or the identification information of an application that is prohibited from accessing the network is classified identification information of the application that is prohibited from accessing the network; and the control unit 701 may be further configured to determine an access reference indicator, where the access reference indicator includes classified reference information, or the access reference indicator includes classified reference information and user class reference information, the classified reference information is used to provide reference information for controlling a category of an application that accesses the network, and the user equipment class control information is used to provide reference information for controlling a class of user equipment that accesses the network. The sending unit 702 may be further configured to send, to an access network device, the access reference indicator determined by the control unit 701. Specifically, the sending unit 702 may send the access reference indicator to the access network device by using control-plane signaling (which may be, for example, control-plane signaling on through S1 interface).

Figure 8:
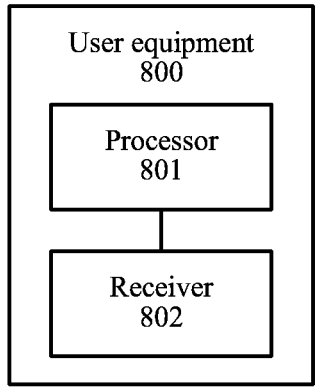
FIG. 8 is a block diagram of a structure of user equipment according to an embodiment of the present application.

FIG. 8 is a block diagram of a structure of user equipment according to an embodiment of the present application. User equipment 800 shown in FIG. 8 can execute the steps executed by the user equipment in FIG. 1 or FIG. 4. As shown in FIG. 8, the user equipment 800 includes a processor 801 and a receiver 802.

The processor 801 is configured to acquire application configuration information, where the application configuration information includes identification information of an application that is allowed to access a network or identification information of an application that is prohibited from accessing a network. Specifically, the receiver 802 may be configured to receive the application configuration information that is sent by a core network device. The application configuration information may be sent to the user equipment by the core network device by using Open Mobile Alliance Device Management (OMA DM), or may be sent to the user equipment by the core network device by using non-access stratum (NAS) signaling. The processor 801 is specifically configured to determine the application configuration information received by the receiver 802 as the application configuration information. Alternatively, the processor 801 may acquire application configuration information preconfigured in the user equipment 800, and determine the preconfigured application configuration information as the application configuration information.

The receiver 802 is configured to receive access control information that is sent by an access network device. Specifically, the access control information received by the receiver 802 may be broadcast by the access network device. Alternatively, when the user equipment 800 is in connected mode, the receiver 802 receives the access control information from the access network device by using dedicated signaling.

The processor 801 is further configured to determine, according to the application configuration information and the access control information, whether to allow an application of the user equipment 800 to access the network.

The user equipment 800 shown in FIG. 8 needs to determine, according to both the application configuration information and the access control information, whether to allow the application of the user equipment to access the network. In other words, the user equipment 800 not only needs to determine whether the application of the user equipment satisfies a condition with which the application configuration information limits whether an application can access the network, but also needs to determine whether the application of the user equipment (and/or the user equipment) satisfies a condition with which the access control information limits whether an application (and/or the user equipment) can access the network. The application of the user equipment can access the network only when both the two restriction conditions are satisfied.

Further, the access control information may include user equipment class control information and classified control information.

Optionally, as an embodiment, the access control information includes user equipment class control information, and the processor 801 is specifically configured to determine, according to a class of the user equipment, the user equipment class control information, and the application configuration information, whether to allow the application of the user equipment to access the network.

Optionally, that the processor 801 is specifically configured to determine, according to a class of the user equipment, the user equipment class control information, and the application configuration information, whether to allow the application of the user equipment to access the network includes: an access layer of the processor 801 sends the user equipment class control information to a protocol stack upper layer of the processor 801, and the protocol stack upper layer of the processor 801 determines, according to the class of the user equipment, the user equipment class control information, and the application configuration information, whether to allow the application of the user equipment to access the network, where the class of the user equipment is stored at the protocol stack upper layer of the processor 801 or is received from the access layer of the processor 801 by the protocol stack upper layer of the processor 801.

Optionally, that the processor 801 is specifically configured to determine, according to a class of the user equipment, the user equipment class control information, and the application configuration information, whether to allow the application of the user equipment to access the network includes: an access layer of the processor 801 determines, according to the class of the user equipment and the user equipment class control information, whether to allow the user equipment to access the network; in a case in which a protocol stack upper layer of the processor 801 receives determining information that is sent by the access layer of the processor 801 and that is used to instruct to allow the application of the user equipment to access the network, the protocol stack upper layer of the processor 801 determines, according to the application configuration information, whether to allow the application of the user equipment to access the network; and in a case in which the protocol stack upper layer of the processor 801 receives determining information that is sent by the access layer of the processor 801 and that is used to prohibit the application of the user equipment from accessing the network, the protocol stack upper layer of the processor 801 further prohibits the application of the user equipment from being allowed to access the network.

Optionally, as another embodiment, the identification information of an application that is allowed to access the network is classified identification information of the application that is allowed to access the network, or the identification information of an application that is prohibited from accessing the network is classified identification information of the application that is prohibited from accessing the network, and correspondingly, the access control information includes classified control information; and the processor 801 is specifically configured to determine, according to the application configuration information and the classified control information, whether to allow the application of the user equipment to access the network. In this case, the identification information of the application that is allowed to access the network is classified identification information of the application that is allowed to access the network, or the identification information of the application that is prohibited from accessing the network is classified identification information of the application that is prohibited from accessing the network. Specifically, that the processor 801 is specifically configured to determine, according to the application configuration information and the classified control information, whether to allow the application of the user equipment to access the network includes: a protocol stack upper layer of the processor 801 receives the classified control information that is sent by an access layer of the processor 801, and the protocol stack upper layer of the processor 801 determines, according to the application configuration information and the classified control information, whether to allow the application of the user equipment to access the network.

Further, the access control information may further include user equipment class control information, and in a case in which the access control information includes the user equipment class control information and the classified control information, the processor 801 is specifically configured to determine, according to a class of the user equipment, the user equipment class control information, the application configuration information, and the classified control information, whether to allow the application of the user equipment to access the network. In this case, the identification information of the application that is allowed to access the network is classified identification information of the application that is allowed to access the network, or the identification information of the application that is prohibited from accessing the network is classified identification information of the application that is prohibited from accessing the network.

Optionally, that the processor 801 is specifically configured to determine, according to a class of the user equipment, the user equipment class control information, the application configuration information, and the classified control information, whether to allow the application of the user equipment to access the network includes: a protocol stack upper layer of the processor 801 receives the user equipment class control information and the classified control information that are sent by an access layer of the processor 801, and the protocol stack upper layer of the processor 801 determines, according to the class of the user equipment, the user equipment class control information, the classified control information, and the application configuration information, whether to allow the application of the user equipment to access the network, where the class of the user equipment is stored at the protocol stack upper layer of the processor 801 or is received from the access layer of the processor 801 by the protocol stack upper layer of the processor 801.

Optionally, that the processor 801 is specifically configured to determine, according to a class of the user equipment, the user equipment class control information, the application configuration information, and the classified control information, whether to allow the application of the user equipment to access the network includes: an access layer of the processor 801 determines, according to the class of the user equipment and the user equipment class control information, whether to allow the application of the user equipment to access the network; in a case in which a protocol stack upper layer of the processor 801 receives determining information that is sent by the access layer of the processor 801 and that is used to instruct to allow the application of the user equipment to access the network, the protocol stack upper layer of the processor 801 determines, according to the application configuration information and the classified control information, whether to allow the application of the user equipment to access the network, where the classified control information is received from the access layer of the processor 801; and in a case in which the protocol stack upper layer of the processor 801 receives determining information that is sent by the access layer of the processor 801 and that is used to instruct to prohibit the application of the user equipment from accessing the network, the protocol stack upper layer of the processor 801 further prohibits the application of the user equipment from being allowed to access the network.

Further, the classified identification information of the application that is allowed to access the network is classified according to a priority, or the classified identification information of the application that is prohibited from accessing the network is classified according to a priority, and correspondingly, the classified control information received by the receiver 802 is priority information. The classified identification information of the application that is allowed to access the network is classified according to a congestion degree, or the classified identification information of the application that is prohibited from accessing the network is classified according to a congestion degree, and correspondingly, the classified control information received by the receiver 802 is congestion degree information. The classified identification information of the application that is allowed to access the network is classified according to an application group, or the classified identification information of the application that is prohibited from accessing the network is classified according to an application group, and correspondingly, the classified control information received by the receiver 802 is group information of the application.

Further, the receiver 802 is further configured to receive the application configuration information that is sent by the core network device. The processor 801 is specifically configured to determine the application configuration information received by the receiver 802 as the application configuration information.

Figure 9:
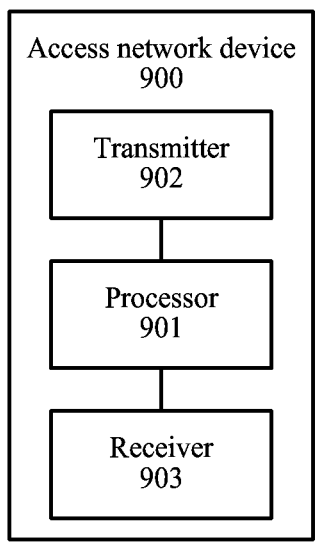
FIG. 9 is a block diagram of a structure of an access network device according to an embodiment of the present application.

FIG. 9 is a block diagram of a structure of an access network device according to an embodiment of the present application. An access network device 900 shown in FIG. 9 can execute the steps executed by the access network device in FIG. 2 or FIG. 4. As shown in FIG. 9, the access network device 900 includes a processor 901 and a transmitter 902.

The processor 901 is configured to determine that congestion occurs on a core network or an access network.

The transmitter 902 is configured to: in a case in which the processor 901 determines that congestion occurs on the core network or the access network, send access control information to user equipment, where the access control information includes classified control information or user equipment class control information, the classified control information is used to control a category of an application that accesses the network, and the user equipment class control information is used to control a class of user equipment that accesses the network and instruct the user equipment to use application configuration information.

Specifically, the transmitter 902 may broadcast the access control information in a broadcast manner. For user equipment in connected mode, the transmitter 902 may send the access control information to the user equipment by using dedicated signaling.

In a case in which it is determined that congestion occurs on the core network or the access network, the access network device 900 shown in FIG. 9 may send the access control information to the user equipment, to control a quantity of applications that access the network. In this way, the quantity of applications that access the network can be controlled, thereby achieving an objective of alleviating a congestion status of the core network or the access network.

Further, the access network device 900 further includes a receiver 903, configured to receive an access reference indicator that is sent by a core network device. The processor 901 is further configured to determine the access control information according to the access reference indicator received by the receiver 903.

Further, the processor 901 is further configured to: in a case in which the processor 901 determines that congestion occurs on the access network, determine that congestion occurs on the access network according to a congestion degree of the access network, and determine the access control information according to the congestion degree of the access network. Specifically, the processor 901 may determine, in a case in which a radio resource is insufficient, that congestion occurs on the access network, or determine, in a case in which a central processing unit, a memory, or the like is occupied to a great extent, that congestion occurs on the access network.

Figure 10:
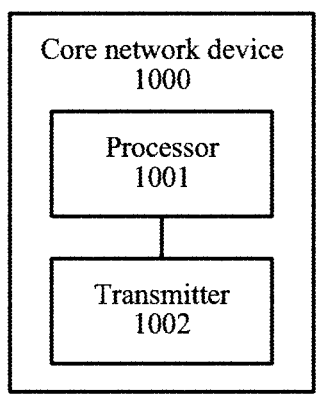
FIG. 10 is a block diagram of a structure of a core network device according to an embodiment of the present application.

FIG. 10 is a block diagram a structure of a core network device according to an embodiment of the present application. A core network device 1000 shown in FIG. 10 can execute the steps executed by the core network device in FIG. 3 or FIG. 4. As shown in FIG. 10, the core network device 1000 includes a processor 1001 and a transmitter 1002.

The processor 1001 is configured to determine application configuration information, where the application configuration information includes identification information of an application that is allowed to access a network or identification information of an application that is prohibited from accessing a network.

Specifically, the identification information may be an identifier of a specific application (for example, WeChat), or may be a company to which an application belongs, or may be an attribute of an application (for example, a video application, an instant messaging application, or a news application), or the like. Further, the identification information of an application that is allowed to access the network may further be classified identification information of an application that is allowed to access a network, or classified identification information of an application that is prohibited from accessing a network. Identification information of an application may be classified by using a priority, a congestion degree, and an application group. The identification information and a classification manner in the application configuration information are set on the side of the core network device in a preset manner. In other words, the application configuration information is determined by the processor 1001 in preset configuration. In addition, the classification manner in the application configuration information is in a one-to-one correspondence with classification in classified control information sent by an access network device. For example, if the identification information of the application is classified by using a priority, the classified control information is priority information.

The transmitter 1002 is configured to send, to user equipment, the application configuration information determined by the processor 1001. Specifically, the transmitter 1002 may send the application configuration information to the user equipment by using Open Mobile Alliance Device Management (OMA DM), or may send the application configuration information to the user equipment by using non-access stratum (NAS) signaling.

The core network device 1000 shown in FIG. 10 may set the application configuration information and send the application configuration information to the user equipment, so that the user equipment may determine, according to the application configuration information, whether to allow an application to access the network. In this way, a congestion status of a network can be alleviated by controlling access of an application to the network.

Optionally, as an embodiment, the processor 1001 may be further configured to determine an access reference indicator, where the access reference indicator includes user equipment class reference information, and the user equipment class reference information is used to provide reference information for controlling a class of user equipment that accesses the network. The transmitter 1002 may be further configured to send, to an access network device, the access reference indicator determined by the processor 1001. Specifically, the transmitter 1002 may send the access reference indicator to the access network device by using control-plane signaling (which may be, for example, control-plane signaling through an S1 interface).

Optionally, as another embodiment, the identification information of an application that is allowed to access the network is classified identification information of the application that is allowed to access the network, or the identification information of an application that is prohibited from accessing the network is classified identification information of the application that is prohibited from accessing the network; and the processor 1001 may be further configured to determine an access reference indicator, where the access reference indicator includes classified reference information, or the access reference indicator includes classified reference information and user class reference information, the classified reference information is used to provide reference information for controlling a category of an application that accesses the network, and the user equipment class control information is used to provide reference information for controlling a class of user equipment that accesses the network. The transmitter 1002 may be further configured to send, to an access network device, the access reference indicator determined by the processor 1001. Specifically, the transmitter 1002 may send the access reference indicator to the access network device by using control-plane signaling (which may be, for example, control-plane signaling through an S1 interface).

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present application essentially, or the part contributing to the prior art, or a part of the technical solutions may be implemented in a form of a software product. The software product is stored in a storage medium and includes several instructions for instructing a computer device (which may be a personal computer, a server, or a network device) or a processor (processor) to perform all or some of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for controlling access of an application to a network, the method comprising:
   acquiring application configuration information, by a user equipment, wherein the application configuration information comprises identification information of an application that is allowed to access the network or identification information of an application that is prohibited from accessing a network;
   receiving, by a receiver of the user equipment, access control information that is sent by an access network device, wherein the access control information comprises user equipment class control information; and
   determining, according to the application configuration information and the access control information, whether to allow an application of the user equipment to access the network, wherein determining whether to allow the application of the user equipment to access the network comprises:
      determining, according to a class of the user equipment, the user equipment class control information, and the application configuration information, whether to allow the application of the user equipment to access the network.

2. The method according to claim 1, wherein determining whether to allow the application of the user equipment to access the network further comprises:
   receiving, by a protocol stack upper layer of the user equipment, the user equipment class control information that is sent by an access layer of the user equipment, and determining, by the protocol stack upper layer according to the class of the user equipment, the user equipment class control information, and the application configuration information, whether to allow the application of the user equipment to access the network, wherein the class of the user equipment is stored at the protocol stack upper layer or is received from the access layer by the protocol stack upper layer; or
   determining, by the access layer of the user equipment and according to the class of the user equipment and the user equipment class control information, whether to allow the application of the user equipment to access the network; in response to a protocol stack upper layer of the user equipment receiving determining information that is sent by the access layer and that instructs to allow the application of the user equipment to access the network, determining, by the protocol stack upper layer according to the application configuration information, whether to allow the application of the user equipment to access the network; and in response to the protocol stack upper layer receiving determining information that is sent by the access layer and that instructs to prohibit the application of the user equipment from accessing the network, prohibiting, by the protocol stack upper layer, the application of the user equipment from being allowed to access the network.

3. The method according to claim 1, wherein:
   the identification information of an application that is allowed to access the network is classified identification information of the application that is allowed to access the network, or the identification information of an application that is prohibited from accessing the network is classified identification information of the application that is prohibited from accessing the network;
   the access control information further comprises classified control information; and
   determining whether to allow an application of the user equipment to access the network further comprises:
      determining, according to the class of the user equipment, the user equipment class control information, the application configuration information, and the classified control information, whether to allow the application of the user equipment to access the network.

4. The method according to claim 3, wherein determining whether to allow the application of the user equipment to access the network further comprises:
   receiving, by a protocol stack upper layer of the user equipment, the classified control information that is sent by an access layer of the user equipment; and
   determining, by the protocol stack upper layer according to the application configuration information and the classified control information, whether to allow the application of the user equipment to access the network.

5. The method according to claim 4, wherein determining whether to allow the application of the user equipment to access the network comprises:
   receiving, by a protocol stack upper layer of the user equipment, the user equipment class control information and the classified control information that are sent by an access layer of the user equipment, and determining, by the protocol stack upper layer according to the class of the user equipment, the user equipment class control information, the classified control information, and the application configuration information, whether to allow the application of the user equipment to access the network, wherein the class of the user equipment is stored at the protocol stack upper layer or is received from the access layer by the protocol stack upper layer; or
   determining, by the access layer of the user equipment according to the class of the user equipment and the user equipment class control information, whether to allow the application of the user equipment to access the network; in response to a protocol stack upper layer of the user equipment receiving determining information that is sent by the access layer and that instructs to allow the application of the user equipment to access the network, determining, by the protocol stack upper layer according to the application configuration information and the classified control information, whether to allow the application of the user equipment to access the network, wherein the classified control information is received from the access layer; and in response to the protocol stack upper layer receiving determining information that is sent by the access layer and that instructs to prohibit the application of the user equipment from accessing the network, prohibiting, by the protocol stack upper layer, the application of the user equipment from being allowed to access the network.

6. The method according to claim 3, wherein:
   the classified identification information of the application that is allowed to access the network is classified according to a priority, or the classified identification information of the application that is prohibited from accessing the network is classified according to a priority, and the classified control information is priority information; or the classified identification information of the application that is allowed to access the network is classified according to a congestion degree, or the classified identification information of the application that is prohibited from accessing the network is classified according to a congestion degree, and the classified control information is congestion degree information; or the classified identification information of the application that is allowed to access the network is classified according to an application group, or the classified identification information of the application that is prohibited from accessing the network is classified according to an application group, and the classified control information is group information of the application.

7. The method according to claim 1, wherein acquiring application configuration information comprises:
receiving the application configuration information that is sent by a core network device.

8. A method for controlling access of an application to a network, the method comprising:
determining application configuration information, by a core network device, wherein the application configuration information comprises identification information of an application that is allowed to access a network or identification information of an application that is prohibited from accessing a network;
sending, using a transmitter, the application configuration information to user equipment;
determining an access reference indicator, wherein the access reference indicator comprises user equipment class reference information, and the user equipment class reference information provides reference information for controlling a class of user equipment that accesses the network; and
sending the access reference indictor to an access network device.

9. The method according to claim 8, wherein:
the identification information of the application that is allowed to access the network is classified identification information of the application that is allowed to access the network, or the identification information of the application that is prohibited from accessing the network is classified identification information of the application that is prohibited from accessing the network; and
wherein the access reference indicator further comprises classified reference information, and the classified reference information provides reference information for controlling a category of an application that accesses the network.

10. User equipment, comprising:
a processor, configured to acquire application configuration information, wherein the application configuration information comprises identification information of an application that is allowed to access a network or identification information of an application that is prohibited from accessing a network; and
a receiver, configured to receive access control information that is sent by an access network device, wherein the access control information comprises user equipment class control information;

wherein the processor is further configured to determine, according to the application configuration information and the access control information that is received by the receiver, whether to allow an application of the user equipment to access the network, wherein determining whether to allow the application of the user equipment to access the network comprises:
determining, according to a class of the user equipment, the user equipment class control information, and the application configuration information, whether to allow the application of the user equipment to access the network.

11. The user equipment according to claim 10, wherein the processor is further configured to:
send, by an access layer of the processor, the user equipment class control information to a protocol stack upper layer of the processor, and determine, by the protocol stack upper layer of the processor, according to the class of the user equipment, the user equipment class control information, and the application configuration information, whether to allow the application of the user equipment to access the network, wherein the class of the user equipment is stored at the protocol stack upper layer of the processor or is received from the access layer of the processor by the protocol stack upper layer of the processor; or
determine, by an access layer of the processor, according to the class of the user equipment and the user equipment class control information, whether to allow the user equipment to access the network; in response to a protocol stack upper layer of the processor receiving determining information that is sent by the access layer of the processor and that instructs to allow the application of the user equipment to access the network, determine, by the protocol stack upper layer of the processor, according to the application configuration information, whether to allow the application of the user equipment to access the network; and in response to the protocol stack upper layer of the processor receiving determining information that is sent by the access layer of the processor and that prohibits the application of the user equipment from accessing the network, prohibit, by the protocol stack upper layer of the processor, the application of the user equipment from being allowed to access the network.

12. The user equipment according to claim 10, wherein:
the identification information of the application that is allowed to access the network is classified identification information of the application that is allowed to access the network, or the identification information of the application that is prohibited from accessing the network is classified identification information of the application that is prohibited from accessing the network, and the access control information comprises classified control information; and
the processor is further configured to determine, according to the class of the user equipment, the user equipment class control information, the application configuration information, and the classified control information, whether to allow the application of the user equipment to access the network.

13. The user equipment according to claim 12, wherein determining whether to allow the application of the user equipment to access the network comprises:
receiving, by a protocol stack upper layer of the processor, the classified control information that is sent by an access layer of the processor, and determining, by the protocol stack upper layer of the processor, according to the application configuration information and the classified control information, whether to allow the application of the user equipment to access the network.

14. The user equipment according to claim 12, wherein determining whether to allow the application of the user equipment to access the network comprises:
receiving, by a protocol stack upper layer of the processor, the user equipment class control information and the classified control information that are sent by an access layer of the processor, and determining, by the protocol stack upper layer of the processor, according to the class of the user equipment, the user equipment class control information, the classified control information, and the application configuration information, whether to allow the application of the user equipment to access the network, wherein the class of the user equipment is stored at the protocol stack upper layer of the processor or is received from the access layer of the processor by the protocol stack upper layer of the processor; or
determining, by an access layer of the processor, according to the class of the user equipment and the user equipment class control information, whether to allow the application of the user equipment to access the network; in response to a protocol stack upper layer of the processor receiving determining information that is sent by the access layer of the processor and that instructs to allow the application of the user equipment to access the network, determining, by the protocol stack upper layer of the processor, according to the application configuration information and the classified control information, whether to allow the application of the user equipment to access the network, wherein the classified control information is received from the access layer of the processor; and in response to the protocol stack upper layer of the processor receiving determining information that is sent by the access layer of the processor and that instructs to prohibit the application of the user equipment from accessing the network, prohibiting, by the protocol stack upper layer of the processor, the application of the user equipment from being allowed to access the network.

15. The user equipment according to claim 12, wherein
the classified identification information of the application that is allowed to access the network is classified according to a priority, or the classified identification information of the application that is prohibited from accessing the network is classified according to a priority, and the classified control information received by the receiver is priority information; or
the classified identification information of the application that is allowed to access the network is classified according to a congestion degree, or the classified identification information of the application that is prohibited from accessing the network is classified according to a congestion degree, and the classified control information received by the receiver is congestion degree information; or
the classified identification information of the application that is allowed to access the network is classified according to an application group, or the classified identification information of the application that is prohibited from accessing the network is classified according to an application group, and the classified control information received by the receiver is group information of the application.

* * * * *